US007532731B2

(12) United States Patent
Aiso et al.

(10) Patent No.: US 7,532,731 B2
(45) Date of Patent: May 12, 2009

(54) DIGITAL MIXER APPARATUS AND METHOD THEREFOR

(75) Inventors: Masaru Aiso, Hamamatsu (JP); Masaaki Okabayashi, Hamakita (JP)

(73) Assignee: Yamaha Corporation, Hamamatsu-Shi (JP)

( * ) Notice: Subject to any disclaimer, the term of this patent is extended or adjusted under 35 U.S.C. 154(b) by 690 days.

(21) Appl. No.: 11/123,727

(22) Filed: May 6, 2005

(65) Prior Publication Data

US 2005/0256595 A1 Nov. 17, 2005

(30) Foreign Application Priority Data

May 14, 2004 (JP) ............................. 2004-145140

(51) Int. Cl.
*H04B 1/00* (2006.01)
*H04B 1/20* (2006.01)
*G06F 17/00* (2006.01)

(52) U.S. Cl. .............................. 381/119; 369/4; 700/94

(58) Field of Classification Search ................. 381/119; 369/4; 700/94; 704/500, 501, 502, 503, 704/504
See application file for complete search history.

(56) References Cited

U.S. PATENT DOCUMENTS

| | | | | |
|---|---|---|---|---|
| 7,058,882 | B2 * | 6/2006 | Kobayashi | 715/204 |
| 2002/0156547 | A1 * | 10/2002 | Suyama et al. | 700/94 |
| 2003/0059066 | A1 | 3/2003 | Kohyama et al. | |

* cited by examiner

*Primary Examiner*—Vivian Chin
*Assistant Examiner*—Kile Blair
(74) *Attorney, Agent, or Firm*—Morrison & Foerster LLP

(57) ABSTRACT

In a digital mixer, one of channels assigned to channel strips is selected, via a select switch, from among a plurality of channels allocated to a layer selected via a layer selection switch. The selected channel is retained in a history table. Each time a history readout switch is depressed, a channel history is read out from the history table. The thus read-out channel is set as an editing channel. In a layer-linking mode, the layer to which the read-out channel is allocated is selected, and the channels contained in the layer are assigned to the channel strips.

20 Claims, 4 Drawing Sheets

DIGITAL MIXER APPARATUS AND METHOD THEREFOR

BACKGROUND OF THE INVENTION

The present invention relates to a digital mixer having a channel selection function.

Audio digital mixers have been known, in which audio signals of a plurality of channels are introduced into input channel signal processing sections of a plurality of channels, and in which digital mixing is performed among signals processed by the signal processing sections so that the mixed signals are output via output channel signal processing sections of a plurality of channels.

In the digital mixing, signal processing parameters are controlled, in each of the input channel signal processing sections and output channel processing sections, in order to control signal processing characteristics.

The user can edit parameters by calling up an editing screen of given signal processing on a display. On the editing screen, a given channel is made a channel to be subjected to editing (i.e., "editing channel"), and a plurality of parameters of the editing channel are displayed on the display. The user can change the editing channel, as desired, by operating a predetermined select switch provided on a control panel. Also, the user can change any of parameter values of the editing channel by operating a numerical value setting operator provided on the control panel.

In some cases, respective values, of a given parameter, in a plurality of channels are displayed on the editing screen, and a cursor is also displayed in relation to the parameter value in a given one of the channels. The user can change the editing channel, as desired, by operating the above-mentioned select switch to move the cursor to the parameter value of another one of the channels. Also, the user can change the parameter value of the editing channel by operating the numerical value setting operator.

Further, in some cases, a selected channel section (or selected channel control section) is provided on the control panel. By operating a predetermined operator provided in the selected channel section, the user can change the value of the parameter corresponding to the predetermined operator. Here, a desired editing channel, for which the parameter value is to be changed via the selected channel section, can be designated via the select switch.

A plurality of channel strips are also provided on the control panel, and each of the channel strips includes the above-mentioned select switch and other operators, such as a fader and rotary operator. The channel strips correspond to the channels on a one-to-one basis in some case. Normally, however, switches for selecting a desired layer (i.e., channel layer) are provided on the control panel so that signals of N (N represents an integral number) channels greater in number than the number M of the channel strips can be processed; namely, in this case, channels assigned to the channel strips can be changed by the user switching between the layers.

During operation for setting parameters in the above-described digital mixers, parameters of various signal processing characteristics, such as "equalizer" and "compressor", are sometimes adjusted sequentially for some selected ones of the channels (i.e., focusing on the selected channels). In such a case, operation for changing the editing channel to another one of the plurality of channels has to be repeated each time the parameter to be adjusted is switched to another parameter, and thus, the necessary operation by the user tends to be very cumbersome. Particularly, in digital mixers having great many channel strips and layers, it would take a long time for the user to find the right select switch for selecting a desired channel, which results in poor operability or usability of the digital mixer.

One example of the digital mixers is disclosed in "DM2000 Instruction Manual" published by Yamaha Corporation, which is available online from the Internet (URL:http://www2.yamaha.co.jp/manual/pdf/pa/japan/mixers/DM2000J.pdf>).

SUMMARY OF THE INVENTION

In view of the foregoing, it is an object of the present invention to provide a digital mixer apparatus which can read out, in response to simple operation, a history of a channel from among histories of a plurality of channels that might belong to a plurality of layers and which can control a signal processing characteristic of the read-out channel as an editing channel.

It is another object of the present invention to provide a digital mixer apparatus which permits a selection as to whether a current layer should be switched, in response to readout of a history of a selected channel, over to a layer which the read-out selected channel belongs to.

According to an aspect of the present invention, there is provided an improved digital mixer apparatus which includes signal processing sections corresponding to N channels and mixes output signals from individual ones of the signal processing sections and in which the N channels are grouped to define a plurality of layers each having a different group of one or more channels allocated thereto and a maximum number of the channels that can be allocated to each one of the layers being a predetermined number M smaller than N. The digital mixer apparatus comprises: a layer selection section that selects any one of the plurality of layers; M channel operation sections each including at least a selecting operator and level operator, the channels allocated to the one layer selected via the layer selection section being assigned respectively to the channel operation sections; a level control section that, in response to operation of the level operator in one of the channel operation sections, controls a signal processing level characteristic in the signal processing section of the channel assigned to the one channel operation section; a channel selection section that, in response to operation of the selecting operator in one of the channel operation sections, selects, as an editing channel, the channel assigned to the one channel operation section; a channel history retaining section that retains histories of channels that have ever been selected as the editing channel via the channel selection section; a history readout section that, in response to a predetermined history readout instruction, reads out one of the histories of the channels retained in the channel history retaining section and selects the channel of the read-out history as the editing channel; an editing channel display section that displays the channel selected as the editing channel; and a selected channel control section that, in response to editing operation, controls a signal processing characteristic in the signal processing section of the channel selected as the editing channel.

Thus, in the digital mixer apparatus of the present invention, a channel, selected as the editing channel by the user operating one of the selecting operator of any one of the channel operation sections with a given layer selected via the layer selection section, can be retained as a channel history in the channel history retaining section, and the channel history can be read out and set as a new editing channel by the user performing simple (e.g., one-touch) operation of a predetermined history readout instruction. It does not matter if the editing channel selected on the basis of readout of the channel history is allocated to (i.e., belongs to) a different layer from the currently-selected layer.

The digital mixer apparatus of the present invention may further comprise a layer link control section that, when the channel of any one of the histories has been selected as the editing channel via the history readout section, controls the layer selection section to select the layer the selected channel is allocated to. Thus, once one of the channels stored as channel histories is recalled as the editing channel, the layer which the recalled channel is allocated to (i.e., belongs to) is automatically selected so that assignment, to the channel operation sections, of the channels in that layer is automatically reproduced. Consequently, mixing setting can also be performed on the recalled channel by the user operating the selecting operator and level operator of the channel operation section.

Further, arrangements may be made such that any one of the layer-linking mode and non-layer-linking mode can be designated or selected as desired by the user. In this case, the same benefits as discussed above can be achieved by designating the layer-linking mode. When a channel history has been read out in the non-layer-linking mode, on the other hand, the currently-selected layer is kept selected so that the assignment, to the channel operation sections (channel strips), of the channels, is left unchanged. Consequently, only where the recalled channel belongs to the current layer, mixing setting can also be performed on the recalled channel by the user operating the selecting operator and level operator of the channel operation section which the recalled channel is assigned to.

The digital mixer apparatus of the present invention may further comprise: a selected layer display section that displays a layer selected via the layer selection section; and a channel-operation-section display section that, when the channel selected as the editing channel is currently assigned to any of the M channel operation sections, makes a display indicative of the channel operation section the selected channel is assigned to. Thus, in the case where the channel selected as the editing channel is currently assigned to any one of the channel operation sections (channel strips), the user can readily visually confirm which of the channel operation sections the selected channel is assigned to.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
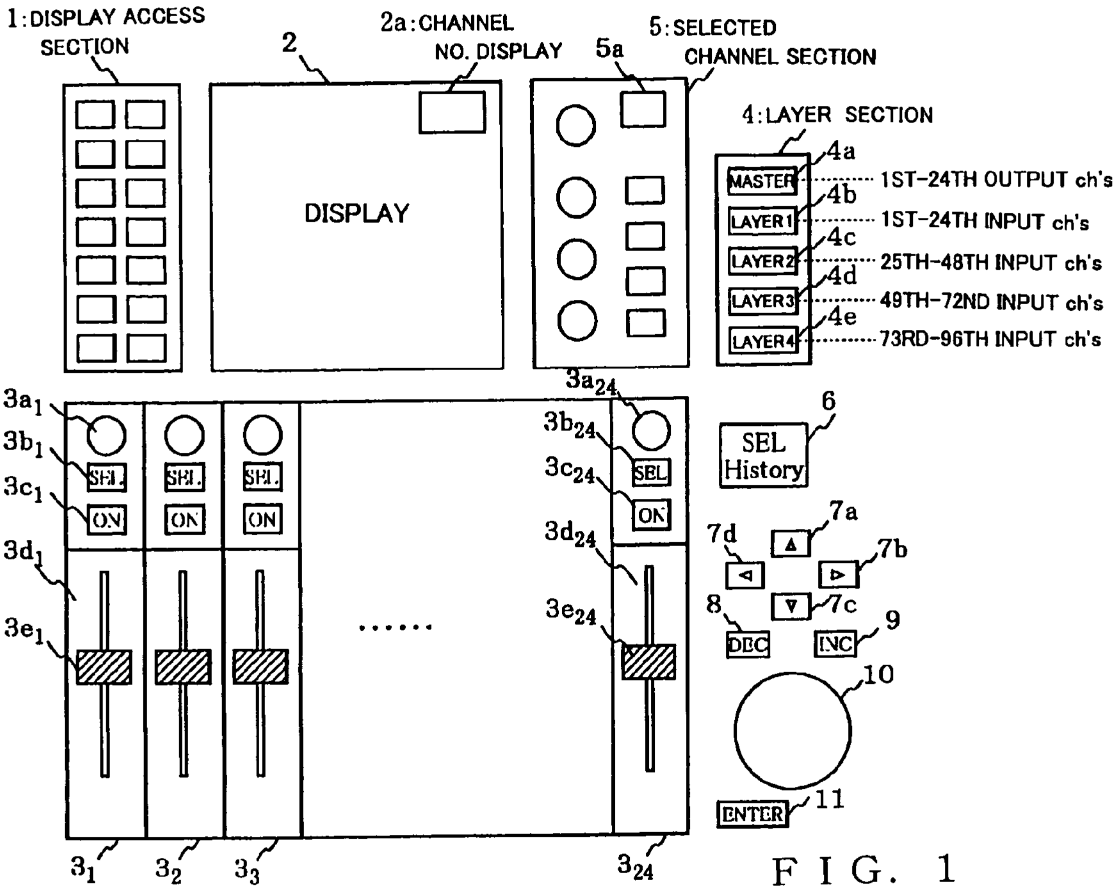
FIG. 1 is a block diagram showing an example of a control panel employed for implementing an embodiment of the present invention

FIG. 1 is a block diagram showing an example of a control panel employed for implementing an embodiment of the present invention, where illustration of operators irrelevant to the present invention is omitted.

The control panel of FIG. 1 is a digital mixer apparatus which mixes output signals from input channel signal processing sections of a plurality of channels and outputs the resultant mixed signals. The digital mixer apparatus also selects a given channel as an editing channel and controls signal processing characteristics in a signal processing section (input channel signal processing section or output channel signal processing section) of the selected channel.

In FIG. 1, reference numeral 1 represents a display access section that includes a plurality of switches for designating a parameter editing page or other page to be displayed on a display 2.

Reference numerals $\mathbf{3}_1, \mathbf{3}_2, \mathbf{3}_3, \ldots, \mathbf{3}_{24}$ represent a plurality of channel strips, which are operator modules for performing processing for a plurality of channels assigned thereto. Namely, each of the channel strips includes actual (physical) operators, switches etc. for one channel.

In the instant embodiment, a plurality of channels (e.g., 96 channels) are divided into a plurality of layers (four layers in the illustrated example), M (e.g., 24) channels per layer; the number M is equal to the total number of the channel strips. A plurality of channels (24 channels) allocated to (i.e., belonging to) a currently-selected layer are assigned to the channel strips $\mathbf{3}_1$-$\mathbf{3}_{24}$, respectively.

Layer section 4 in FIG. 1 includes a plurality of layer selection switches 4*a*-4*e*, and operation, by the user, of any one of the layer selection switches 4*a*-4*e* can select a corresponding layer. The layer selection switches 4*a*-4*e* are self-illuminated switches, each of which is turned on or illuminated when the corresponding layer is selected, and turned off or deilluminated when the corresponding layer is not selected.

In the layer section 4, a "master" layer includes 1st-24th output channels, a first layer ("layer 1") layer includes 1st-24th input channels, a second layer ("layer 2") layer includes 25th-48th input channels, a third layer ("layer 3") layer includes 49th-72nd input channels, and a fourth layer ("layer 4") layer includes 76th-96th input channels, Thus, when "layer 1" is selected, the 1st-24th input channels are assigned to the 1st-24th channel strips (channel strips (1)-(24)), so that the operators of the channel strips $\mathbf{3}_1$-$\mathbf{3}_{24}$ can function as operators for operating the input channel signal processing means (or sections) of the 1st-24th input channels. For example, the 1st output channel, 1st input channel, 25th input channel, 49th input channel and 73rd input channel are allocatable to the first channel strip.

Each of the channel strips $3_1$-$3_{24}$ includes a same set of operators. Reference numerals $3_{a1}$-$3_{a24}$ represent rotary operators each for adjusting a value of a parameter, designated by another operator, for a corresponding one of the channels assigned to the channel strips $3_1$-$3_{24}$. $3_{b1}$-$3_{b24}$ represent select switches for selecting any one of the channels, assigned to the channel strips $3_1$-$3_{24}$, as a channel to be subjected to editing (i.e., "editing channel").

In the illustrated example of FIG. 1, the channels assigned to the channel strips $3_1$-$3_{24}$ can be changed by changing the selected layer, The channel select switches $3_{b1}$-$3_{b24}$ are operable to select any one of the channels, assigned to the channel strips $3_1$-$3_{24}$, as an editing channel.

Stated differently, the selection of the editing channel is made by selecting any one of the channels that are allocated to (i.e., belong to) the layer currently selected via the layer select switches 4*a*-4*e* and are assigned to the channel strips $3_1$-$3_{24}$.

The signal processing characteristics of the input channel signal processing section of the channel selected as the editing channel are controlled on an editing screen displayed on the display 2.

The channel select switches $3_{a1}$-$3_{a24}$ are also self-illuminated switches, each of which is illuminated when the channel assigned to the corresponding channel strip is selected and deilluminated when the channel assigned to the corresponding channel strip is not selected.

Where the editing screen displayed on the display 2 has a channel number display section 2*a*, the channel selected as the editing channel is displayed on the display section 2*a*.

Reference numerals $3_{c1}$-$3_{c24}$ represent channel ON/OFF switches, which control ON/OFF states of output signals from the signal processing sections of the channels assigned to the corresponding channel strips $3_1$-$3_{24}$. $3_{d1}$-$3_{d24}$ represent electric faders, and $3_{e1}$-$3_{e24}$ represent respective knobs of the electric faders $3_{d1}$-$3_{d24}$. The electric faders $3_{d1}$-$3_{d24}$ control respective gains of the channels assigned to the channel strips $3_1$-$3_{24}$.

Reference numeral 5 represents a selected channel section (i.e., selected channel control section). Any one of the channels can be selected as the editing channel by the user first selecting one of the layers via the corresponding layer selecting switch 4*a*-4*e* and then selecting one of the select switches $3_{b1}$-$3_{b24}$. Note that, when any one of the channels belonging to the currently-selected layer is to be selected, the user only has to operate one of the select switches $3_{b1}$-$3_{b24}$.

Parameter value, ON/OFF state of particular operation, etc. of the channel selected as the editing channel can be controlled via corresponding operators in the selected channel section 5. Further, where the selected channel section 5 has a channel number display section 5*a*, the type and unique channel number of the selected editing channel are displayed on the channel number display section 5*a*.

Reference numeral 6 represents a channel history readout switch ("SEL History"). The digital mixer of the present invention includes a storage device for retaining a history table of channels selected via the layer selection switches 4*a*-4E and select switches $3_{b1}$-$3_{b24}$. Each time the channel history readout switch 6 is depressed, one of the channel histories is read out. The channel history readout function allows a desired channel to be directly selected as the editing channel, in place of a channel selection, via the select switch $3_{b1}$-$3_{b24}$, from among the channels of the layer selected via the layer selection switch 4*a*-4*e*.

Figure 2:
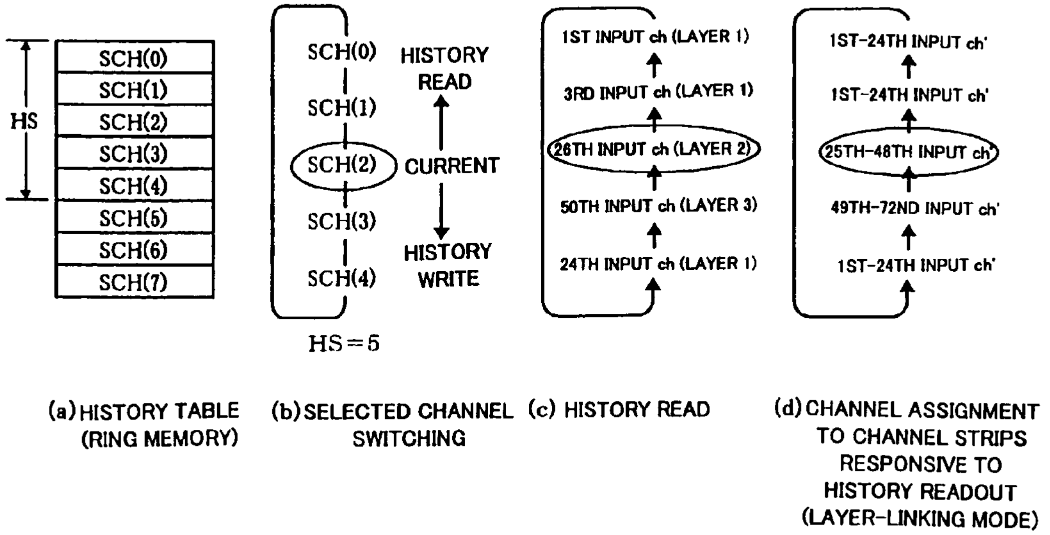
FIG. 2 is a diagram explanatory of channel history writing and reading operations performed in the embodiment of the present invention.

Now, with reference to FIG. 2, a description will be given about channel history writing and reading operations in the embodiment. FIG. 2 is a diagram explanatory of specific examples of the channel history writing and reading operations performed in the instant embodiment of the present invention.

Section (a) of FIG. 2 illustrates the history table, which, depending on a history size (indicated by HS in this case), can retain selected channels as far back as (HS-1)th selection operation; in the illustrated example, the maximum history size HS is seven. Value of the channel history size HS is variable by the user. Sections (b) to (d) of FIG. 2 show a case where the history size HS is five (HS=5). In the illustrated example of FIG. 2, the history table is controlled in a "ring memory" fashion. Histories of selected channels, each stored as SCH(j) in a register j of a range corresponding to the history size HS (j is a variable in a range of "0 to (HS-1)"), are used circularly.

Details of the history writing and reading to and from the history table will be discussed later with reference to FIGS. 6B and 6C.

As seen in section (b) of FIG. 2, each time any one of the channel select switches $3_{b1}$-$3_{b24}$ is operated by the user, the selected channel is written into the history table with a write pointer ("j" is used as the pointer) incremented by one. Once any one of the channel select switches $3_{b1}$-$3_{b24}$ is operated when the pointer j is "2" (j=2), the pointer j is incremented to "3" (j=3), and the channel selected by the operation of the one channel select switch is written as SCH(3). If another one of the select switches $3_{b1}$-$3_{b24}$ is operated after that, the pointer j is incremented to "4", and the channel selected by the operation of the other select switch is written as SCH(4).

When the selected channel has not been changed, e.g. when the same channel select switch has been operated in succession with the selected layer left unchanged, writing of the selected channel may be inhibited so that the channel histories in the table are not updated.

As also seen in section (b) of FIG. 2, each time the channel history readout switch 6 is operated, a read pointer j is decremented by one so that the selected channel immediately preceding the current selected channel is read out. For example, when the channel history readout switch 6 has been depressed once when the read pointer j is "2" (j=2), the pointer j is decremented to "1" (j=1), and the channel that has been stored as SCH(1) is read out as the editing channel. If the channel history readout switch 6 is operated once again after that, the pointer j is decremented from "1" to "0", and the channel that has been stored as stored as SCH(0) is read out as the editing channel.

The history table has been described above as retaining information of the selected channels. Alternatively, the history table may retain pairs of information of selected layers and selected channel strips, in place of the information of the selected channels alone. In this case, one particular selected channel can be identified by one of the pairs of information of selected layers and selected channel strips. However, the information of selected layers and selected channel strips need not necessarily be recorded in pairs as long as the histories of the layer selection operation and the histories of the channel strip selection operation can be known from the history table.

As set forth above, the history table retains only the selected channel information, or the selected layer information and selected channel strip information that can be substantially said to be selected channel information. The history table does not retain histories unrelated to the selected channels, such as those of the contents of the editing screen page displayed on the display 2, parameter editing of that page and operation of other operations on the control panel.

Thus, when a plurality of particular channels have been selected as the editing channels and various characteristic controls are to be performed on the input channel signal processing sections of these selected channels (i.e., focusing on the selected channels), the individual selected channels can be stored into the history table by the user sequentially switching among the editing channels for a particular one of the various characteristic controls. Then, by repetitively operating the channel history readout switch 6 after appropriately changing the editing screen and operators to be operated in the selected channel section 5, the plurality of particular channels can be read out circularly to become the editing channels. During that time, the same characteristic control is performed on each of the read-out channels via the same parameter editing page displayed on the display 2 and via the same operators of the selected channel section 5. As a result, the various characteristic controls can be performed efficiently on the input channel signal processing means of the plurality of editing channels.

Note that the displayed contents of the channel number display section 2*a* on the display 2 and channel number display section 5*a* on the display 5 are varied as the selected channels are sequentially read out through operation of the channel history readout switch 6. The selected channels need not necessarily be displayed on both of the channel number display sections 2*a* and 5*a*; they only have to be displayed on one of the channel number display sections 2*a* and 5*a*.

Further, whenever a particular channel is selected via the channel history readout switch 6, the select switch $3_{b1}$-$3_{b24}$ associated with the channel strip $3_1$-$3_4$, to which the selected channel is assigned, is illuminated as in the case of the normal channel selection operation, if the layer containing the selected channel has been selected. Therefore, the user can confirm the selected channel by viewing the illuminated select switch.

Whether or not the layer selection state should be changed in response to channel selection operation via the channel history readout switch 6 and in accordance with the selected channel depends on the situation on each occasion.

In the instant embodiment, the digital mixer can be selectively placed in any one of a layer-linking mode and non-layer-linking mode, in response to predetermined operation by the user.

When a particular channel has been selected by operation of the channel history readout switch 6 while the digital mixer is in the layer-linking mode, the layer which the selected particular channel belongs to is selected in response to the selection of the particular channel, so that the plurality of channels belonging to the selected layer are assigned to the channel strips $3_1$-$3_{24}$.

Let's now consider a case where the selected channel is changed from the 26th input channel to the 3rd input channel, 1st input channel, 24th input channel and then 50th input channel as illustrated in section (c) of FIG. 2. In this case, the selected layer is changed, in response to the change in the selected channel, from the 2nd layer to the 1st layer, again 1st layer, once again 1st layer and then to the 3rd layer, in response to which the layer select switches corresponding to the selected layers are illuminated.

Thus, the channels assigned to the channel strips $3_1$-$3_{24}$ are changed from the 25th-48th input channels to the 1st-24th input channels, again the 1st-24th input channels, once again the 1st-24th input channels and then to the 49th-72nd input channels, and thus, the channels selected via the select switches $3_1$-$3_{24}$ are changed in a similar manner.

In the non-layer-linking mode, even when the selected channel has been changed by operation of the channel history readout switch 6, the layer containing the newly-selected channel is not changed; that is, the layer that was being selected immediately before the operation of the channel history readout switch 6 is kept selected. As a consequence, the illumination/deillumination states of the layer select switches 4*a*-4*e* are left unchanged, and the channels of the current selected layer are still kept assigned to the select switches $3_1$-$3_{24}$. For example, even if the selected channel has been changed, by operation of the channel history readout switch 6, from the 26th input channel to the 3rd input channel, 1st input channel, 24th input channel and then 50th input channel as illustrated in section (c) of FIG. 2, the selected layer is left unchanged from the second layer, so that the 25th-48th input channels are still kept assigned to the select switches $3_1$-$3_{24}$.

Thus, when a channel history is read out to select an editing channel in the layer-linking mode, the user can recognize the channel selected as the editing channel from the illumination/deillumination states of the layer selection switches 4*a*-4*e* and select switches $3_{b1}$-$3_{b24}$, as in the case of the normal channel selection operation.

In the non-layer-linking mode, however, the channel selected on the basis of the read-out channel history is not necessarily contained in the current selected layer. Therefore, only when the channel selected on the basis of the read-out channel history is contained in (i.e., belongs to) the current selected layer, the selected channel can be recognized from the illumination/deillumination states of the layer selection switches 4*a*-4*e* and select switches $3_1$-$3_{24}$. If the selected channel is contained in another layer than the current selected layer, all of the select switches $3_1$-$3_{24}$ are deilluminated, so that the selected channel can be recognized from the illumination/deillumination states of the select switches $3_1$-$3_{24}$.

Referring back to FIG. 1, reference numerals 7*a*-7*d* represent cursor keys, which are pointing operators (devices or elements) to be used to selectively designate any one of button type operators, numerical value entry boxes, knob type operators, fader type operators, etc. Touchpad and/or a mouse may be employed in addition to, or in place of, the pointing operators.

Decrement (DEC) switch 8 and increment (INC) switch 9 are operable to turn on or off a button type operator designated by any of the pointing operators 7*a*-7*d* or vary an operating amount of a designated fader type operator so as to increase or decrease the corresponding parameter value or other numerical value. Also, the DEC switch 8 and INC switch 9 are used to cancel or accept (give an OK to) user operation. ENTER switch 11 is operable to confirm the numerical value increased or decreased via the DEC switch 8, INC switch 9, rotary encoder 10 or the like if the numerical value need be confirmed.

Figure 3A:
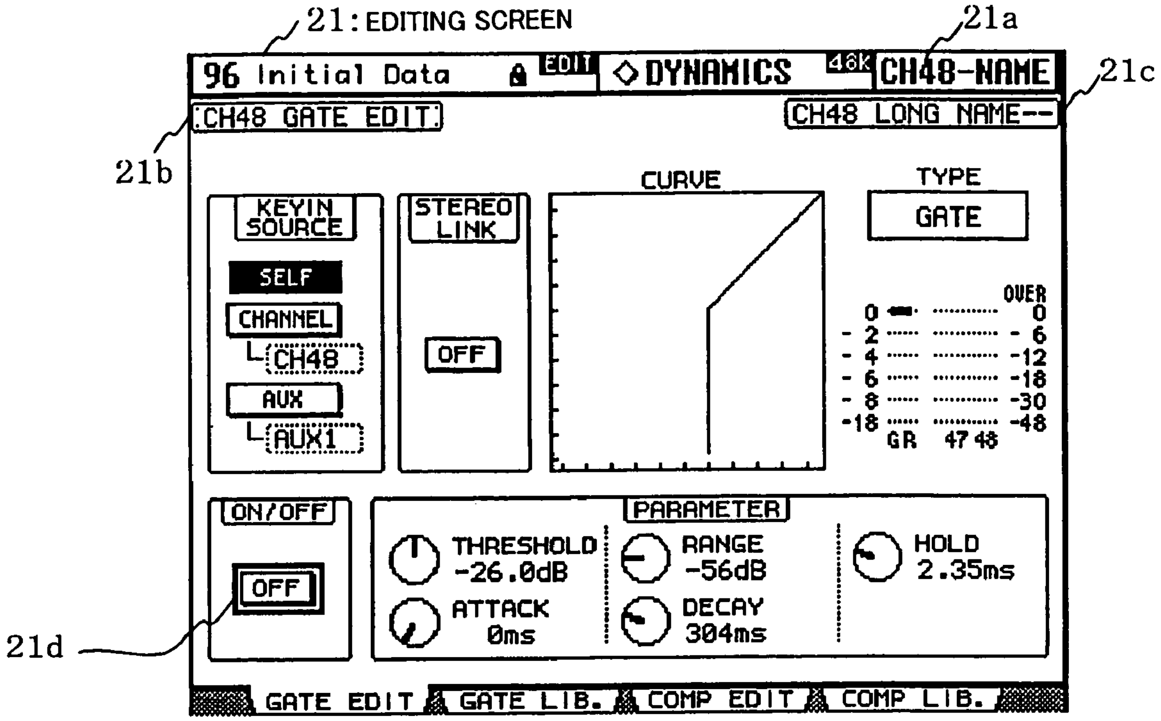
FIGS. 3A and 3B are diagram explanatory of a specific example of user's channel selection operation in the embodiment of the present invention.
Figure 3B:
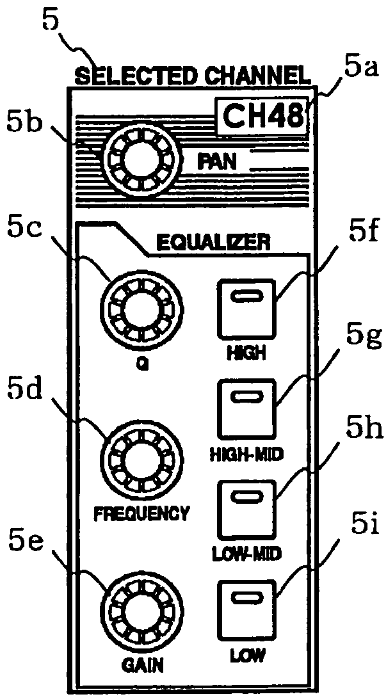

FIGS. 3A and 3B are diagram explanatory of a specific example of the channel selection operation in the instant embodiment.

FIG. 3A shows an example of a GUI (Graphical User Interface) editing screen 21 displayed on the display 2 in response to user's switch operation on the display access section 1 shown in FIG. 1. On the display 2, there can be displayed various other GUI editing screens, such as those for controlling various signal processing blocks shown in FIG. 4.

More specifically, FIG. 3A shows an editing screen called "Dynamics", which is a screen for controlling values of a plurality of "gate" type parameters to cut signals having less than a predetermined tone volume level. Once any of the cursor keys 7*a*-7*d* of FIG. 1 is operated, the cursor 21*d* sequentially moves past the knob type or button type operators, to thereby select a desired parameter. Then, the rotary encoder 10 or DEC or INC switch 8 or 9 is operated to adjust the value of the selected parameter. Among the parameters selectable via the cursor 21*d* are ones of which the adjusted value is not made effective until the adjusted value is confirmed via the ENTER switch 11.

Once any one of the select switches select switches $3_{b1}$-$3_{b24}$ is operated to change the editing channel while the editing screen 21 is being displayed, the screen is switched to an editing screen of the same parameter for the newly-selected editing channel. The newly-selected editing channel is displayed on the channel number display section 21*a* (corresponding to the channel number display section 2*a* of FIG. 1) and other sections 21*b* and 21*c*.

FIG. 3B is a diagram explanatory of a specific example of the selected channel section 5 shown in FIG. 1. 5*a* represents a channel number display section, 5*b* represents an operator for adjusting parameters to determine localization of stereo channels, 5*c*, 5*d* and 5*e* represent operators for adjusting parameters of sharpness (Q), center frequency and gain of a parametric equalizer, and 5*f*-5*i* represent operators for selecting any one of four bands of an object to be adjusted. Once any one of these operators is operated, the value of the corresponding parameter is displayed in a popup fashion. The editing channel to be controlled via the selected channel section 5 is also selected by one of the channel select switches $3_1$-$3_{24}$.

Figure 4A:
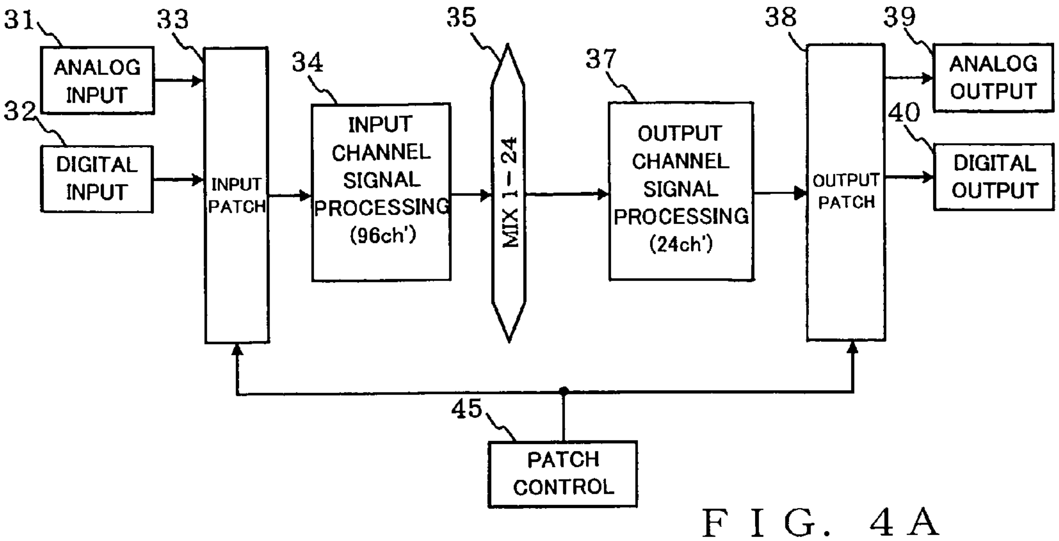
FIGS. 4A and 4B are block diagrams explanatory of signal processing performed in a digital mixer apparatus implementing the embodiment of the present invention shown in FIG. 1.
Figure 4B:
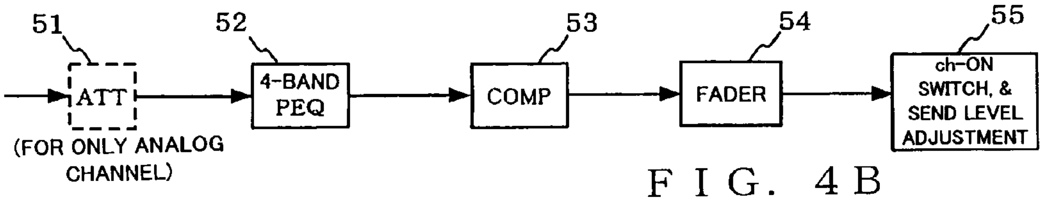

FIGS. 4A and 4B are block diagrams explanatory of the signal processing performed in the digital mixer apparatus of the invention.

FIG. 4A is an overall view of the signal processing that is performed in the digital mixer by a DSP 69 and waveform I/O 68 as will be later described in relation FIG. 5. In the figure, reference numeral 31 represents a plurality of analog signal input sections, each of which receives an analog signal via an input terminal, converts the analog signal into digital representation and then outputs the A/D-converted signal. 32 represents a plurality of digital signal input sections, each of which receives a digital signal via an input terminal and then directly outputs the digital signal. Respective outputs from the analog signal input sections 31 and digital signal input sections 32 are delivered to an input patch section 33. The input patch section 33 is controlled by a patch control section 45 so that one of the plurality of the input sections is selectively coupled to individual input channel signal processing sections 34 of 96 channels.

Each of the input channel signal processing sections 34 controls characteristics of the input signal and selectively outputs the thus-controlled signal to at least one of a plurality of mix buses (24 mix buses in this case) 35, where the signals from the input channel signal processing sections 34 are mixed.

Output mixed signals of the individual mix buses 35 are passed to a plurality of output channel signal processing sections 37 of 24 channels which correspond to the mix buses 35 on a one-to-one basis. The output channel signal processing sections 37 controls characteristics of the mixed signals from the mix buses 35 and outputs the thus-controlled mixed signals to an output patch section 38.

Under control of the patch control section 45, the output patch section 38 selectively couples the outputs from the individual output channel signal processing sections 37 to a plurality of analog signal output sections 39 and a plurality of digital signal output sections 40.

The analog signal output sections 39 each convert the digital signals into an analog signal and output the thus D/A-converted signal to an output terminal. The digital signal output sections 40 each output the digital signal directly to an output terminal.

The output channel signal processing section 37 of each channel is capable of outputting the signal to the plurality of analog signal output sections 39 or the plurality of digital signal output sections 40.

FIG. 4B is explanatory of signal processing carried out in each of the input channel signal processing sections 34. Each of the input channel signal processing section 34 includes an attenuator 51, a parametric equalizer 52, a compressor 53, a fader 54, a block 55 including send level adjustment section for adjusting levels of outputs to the individual buses (illustration of other buses than the mix buses is omitted), etc. Each of the output channel signal processing sections 37 is also constructed in generally the same manner as shown in FIG. 4B, except that it does not include the attenuator 51 and the block 55 does not include the send level adjustment section.

Each signal input to the input channel signal processing section 34 is first adjusted, by the attenuator 51, to a level suitable for signal processing at stages following the attenuator 51, and then the frequency characteristics of the signal are controlled by the parametric equalizer 52. Then, the compressor 53 dynamically controls the level of the signal in accordance with it varying signal level. Further, the fader 54 controls the level of the signal for mixing purposes. After that, ON/OFF control is performed on the signal via a channel-ON (ch ON) switch in the block 55, and send ON/OFF conditions and send levels with which the signal is to be sent or delivered to the individual buses are adjusted by the send adjustment section.

The electric faders $3_{d1}$-$3_{d24}$ of the channel strips $3_1$-$3_{24}$ control the respective faders 54 of the input channel signal processing sections 34 or output channel signal processing sections 37. For example, once the knob $3_{e5}$ of the electric fader $3_{d5}$ of the channel strip, to which the 29th input channel is assigned, while the second layer is selected, the gain for level control of the fader 54 of the 29th input channel is controlled.

The editing screen 21 of FIG. 3A is a screen for controlling the compressor 53 of any one of the input channel signal processing sections 34 and output channel signal processing sections 37. The compressor 53 includes a gate element for turning off the signal when the level of the signal is smaller than a preset threshold value, and a compressor element for restricting the level of the signal when the signal level is greater than a preset threshold value. Using tabs provided in a lower end portion of the editing screen 21, the user can select which one of the gate element and compression section should be set as an object of editing.

In the illustrated example of FIG. 3A, the compressor function of the 48th input channel is currently selected, so that, as a predetermined knob type parameter on the editing screen is operated to adjust a parameter value, control is performed on signal processing characteristics of the gate element in the compressor 53 of the 48th input channel.

When a signal to be sent from the input channel signal processing section 34 of the current editing channel to two (paired) mix buses 35, the selected channel section 5 shown in FIG. 3B controls left and right localization (panning) characteristics of the send level adjustment section in the block 55, as well as frequency characteristics of the four-band parametric equalizer 52 in the input channel signal processing section 34 of the editing channel.

Figure 5:
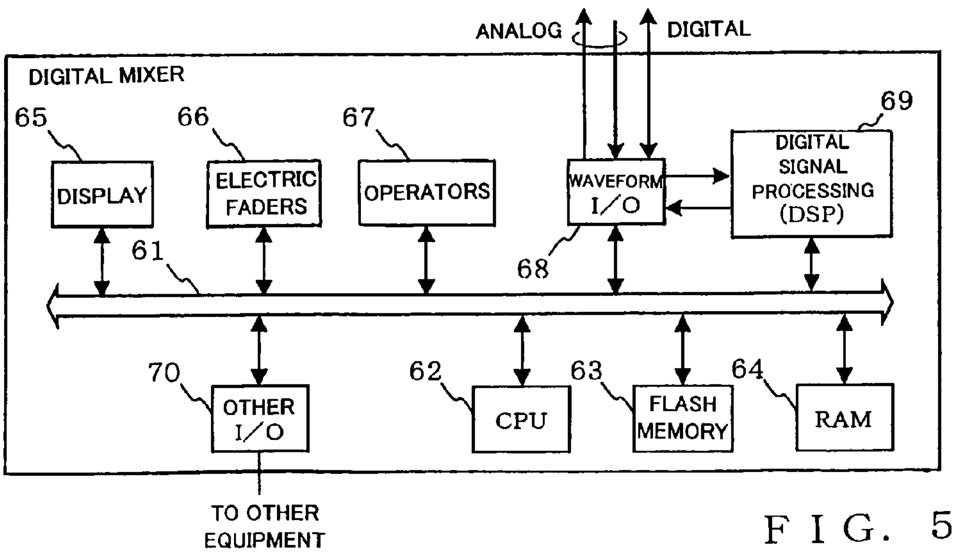
FIG. 5 is a block diagram showing an example general hardware setup of the embodiment of FIG. 1.

FIG. 5 is a block diagram showing an example general hardware setup for implementing the embodiment of FIG. 1.

In the figure, reference numeral 61 represents a bus, and 62 represents a CPU (Central Processing Unit). 63 represents a flash memory that has a control program and preset data rewritably stored therein. The control program may be executed after having been loaded from the flash memory 63 to a RAM (Random Access Memory) 64.

The CPU 62 executes the control program to perform the selected channel history writing function and history reading functions, as illustratively shown in FIGS. 1 and 2, and control the entire digital mixer apparatus. The RAM 64 includes working memory areas, which in turn include a current memory area for storing current values of various parameters for controlling the signal processing characteristics of the various signal processing blocks shown in FIG. 4.

The digital mixer apparatus of the present invention also includes a display unit 65, which includes, in addition to the display 2 of FIG. 1, light emitting diodes (LEDs) provided for various switches, such as the select switches $\mathbf{3}_{b1}$-$\mathbf{3}_{b24}$ and layer selection switches 4*a*-4*e*, and the channel number display section 5*a*. 66 represents electric faders that correspond to the electric faders $\mathbf{3}_{d1}$-$\mathbf{3}_{d24}$ of FIG. 1, and 67 represents other operators.

The digital mixer apparatus of the present invention also includes the waveform input/output interface section 68, which passes an externally-input analog signal to the signal processing section 69 after necessary A/D conversion or passes an externally-input digital signal directly to the signal processing section 69. Further, the waveform input/output interface section 68 outputs a digital signal received from the signal processing section 69, directly in the digital representation, or after necessary D/A conversion. The waveform input/output interface section 68 realizes the functions represented by the plurality of analog signal input sections 31 and digital signal input section 32 and the plurality of analog signal output sections 39 and digital signal output sections 40 shown in FIG. 4A.

The signal processing section 69, which is in the form of a DSP (Digital Signal Processor), performs signal processing on each digital signal, input via the waveform input/output interface section 68, on the basis of microprograms supplied from the CPU 62 and outputs the thus-processed digital signal to the waveform input/output interface section 68. The DSP 69 realizes the signal processing functions represented by the input patch section 33, input channel signal processing sections 34, mix buses 35, output channel signal processing sections 37, output patch section 38, etc. shown in FIG. 4A.

Reference numeral 70 represents another input/output interface section, which is controlled by an externally-connected personal computer and allows setting operation, similar to that performed on the body of the mixer apparatus, to be performed in the externally-connected personal computer as well.

Figure 6A:
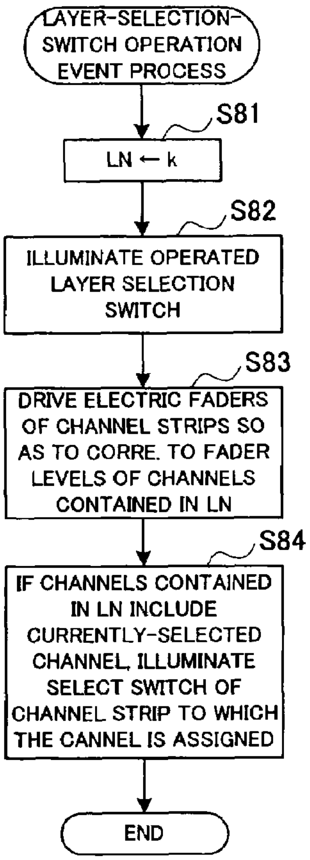
FIGS. 6A-6C are flow charts explanatory of various examples of processes performed in the embodiment of FIG. 1.
Figure 6B:
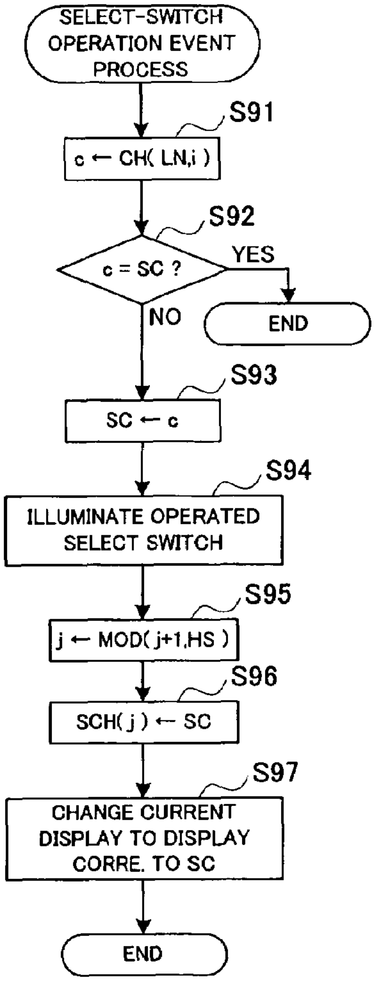
Figure 6C:
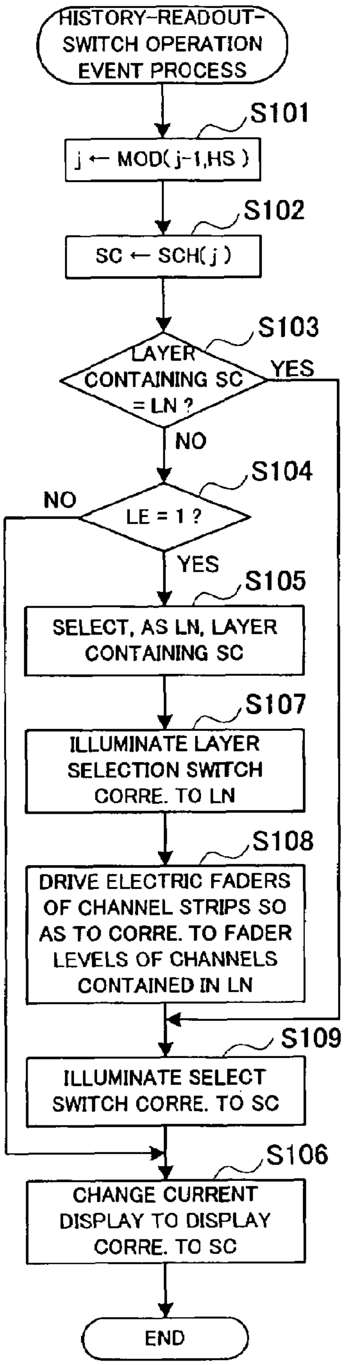

FIGS. 6A-6C are flow charts explanatory of various examples of processes performed in the embodiment of FIG. 1.

In accordance with the control program, the CPU 62 shown in FIG. 5 performs a setting process on the current memory and a process for transferring setting values to the digital signal processing section 69. The digital signal processing section 69 performs signal characteristic control and mixing processing in accordance with the setting values.

The above-mentioned control program performs a predetermined initialization process upon powering-on of the digital mixer apparatus, and then a "screen control task", "panel operator control task", "memory control task", "DSP control task" and "other control task" are carried out in response to respective events.

FIG. 6A shows a layer-selection-switch operation event process that is started up in response to an operation event of any one of the layer selection switches 4*a*-4*e* of FIG. 1. The layer number assigned to the operated layer selection switch is indicated by "k" for convenience of explanation.

At step S81, the above-mentioned layer number k is stored into a register LN; hereinafter, the layer number of the current selected layer is indicated by "LN" and the current selected layer is also indicated with the reference character "LN", for convenience of explanation. At following step S82, only the layer selection switch corresponding to the current selected layer number LN, i.e. the operated layer selection switch, is illuminated.

At step S83, the electric fader knobs $\mathbf{3}_{e1}$-$\mathbf{3}_{e24}$ of the channel strips $\mathbf{3}_{1}$-$\mathbf{3}_{24}$, to which the channels belonging to the selected layer are assigned, are driven by motors so that the fader knobs $\mathbf{3}_{e1}$-$\mathbf{3}_{e24}$ are adjusted to correspond to respective fader levels of the channels contained in the current selected layer LN. At next step S84, if the channels belonging to the current selected layer LN includes a currently-selected channel (channel number SC), then only the select switch $\mathbf{3}_{b1}$-$\mathbf{3}_{b24}$ of the channel strip, to which the selected channel (for convenience, hereinafter indicated with the reference character "SC") is assigned, is illuminated.

FIG. 6B shows a select-switch operation event process that is started up in response to an operation event of any one of the select switches $\mathbf{3}_{b1}$-$\mathbf{3}_{b24}$. The channel strip number assigned to the operated select switch is indicated by "i", for convenience of explanation.

At step S91, a channel number CH (LN, i) that is determined in accordance with the number LN of the current selected layer stored in the register LN and channel strip number i is stored into a register c, and the channel number SC of the current selected channel is stored into a register SC.

At following step S92, a determination is made as to whether the value c stored in the register c, indicative of the channel selected by operation of any one of the select switches $\mathbf{3}_{b1}$-$\mathbf{3}_{b24}$ agrees with the channel number of the current selected channel stored in the register SC, and, if so, the process is brought to an end. If the value c stored in the register c does not agrees with the channel number SC, the process moves on to step S93, where the number c of the newly selected channel is stored into the register SC as the number SC of the current selected channel.

At next step S94, the channel select switch corresponding to the number SC of the current selected channel, i.e. the operated select switch, is illuminated with the other select switches deilluminated.

Next, the stored contents of the history table shown in section (a) of FIG. 2 are updated. "j" is the pointer that specifies one history register, as noted earlier. The history size HS indicates the number of histories storable in the history table; if HS=1, it means that there is no history storable.

At step S95, the value of the register j is incremented by one through modulo arithmetic. However, because the value of the register j returns to "0" once the incremented value reaches the value of the history size HS, the value of the register j is incremented by one in a circular manner. At step S96, the number of the current selected channel stored in the register SC is stored into the register j as SCH(j). Because the register j is incremented by one at step S95 as noted above, the address at which the selected channel is to be written is circularly incremented by one in the forward direction each time one of the channel select switches $\mathbf{3}_{b1}$-$\mathbf{3}_{b24}$ is selected.

At step S97, the channel number display section 2*a* of the display 2 and the channel number display section 5*a* displayed in the selected channel section 5 are caused to indicate the number of the current selected channel SC, and various parameters (parameter values and operating amounts of operators) are updated with those corresponding to the current selected channel. Then, the process is brought to an end.

Note that operating one of the layer switches 4a-4e alone can only change the selected layer and can not change the selected channel. Namely, any one of the plurality of channels belonging to the current selected layer can be selected by the user operating one of the channel select switches $3_{b1}$-$3_{b24}$.

FIG. 6C shows a history-readout-switch operation event process that is started up in response to an operation event of the channel history readout switch ("SEL history") 6.

To read a desired history from the history table shown in section (a) of FIG. 2 when the current register number is j, it is only necessary that the register number j be decremented and then the selected channel stored in the register j be read out.

Because the history table functions as a ring memory, the register j as the read pointer j is decremented by one through modulo arithmetic MOD (j−1, HS), at step S101. If the value of the register j at the time point when the history-readout-switch operation event process has been started is "0", MOD (0−1, HS)=HS-1, and thus, the read pointer j is moved in a circular manner.

At step S102, the number of the selected channel SCH(j) stored in the register j is stored into the register SC retaining the channel number of the selected channel SC.

At step S103, a determination is made as to whether the layer number of the layer containing the current selected channel SC agrees with the number of the current selected channel LN stored in the register LN. If the number of the layer containing the current selected channel SC agrees with the number of the current selected channel LN, the process immediately moves on to step S109, where illumination/deillumination control is performed on the channel select switches $3_{b1}$-$3_{b24}$.

If, on the other hand, the number of the layer containing the current selected channel SC does not agree with the number of the current selected channel LN as determined at step S103, a layer change operation is carried out at steps S105-S108. Before that, a determination is made at step S104 as to whether or not the digital mixer apparatus is currently in the layer-linking mode.

Here, "LE" is a variable indicating whether or not the selection of the layer should be linked to the selection of the channel at the time of readout of the history. When the variable LE is set to "1", the layer link (layer-linking mode) is made effective, which means that, as a particular channel is selected by readout of a history from the history table, the layer containing the selected channel is selected.

Therefore, at and after step S105, control is performed as if the layer containing the current selected channel number SC were selected by operation of any one of the layer switches 4a-4e. First, at step S105, the unique number of the layer containing the current selected channel number Sc is stored into the register LN to set it as the current selected layer number LN. At following steps S107 and S108, similar operations to steps S82 and S83 shown in FIG. 6A are carried out.

Then, at step S109, one of the channel select switches $3_{b1}$-$3_{b24}$, which corresponds to the current selected channel number SC, is illuminated with the other select switches deilluminated. However, the determination operation at step S84 is unnecessary because it is already known that the current selected layer LN contains the current selected channel SC.

At step S106, the current channel display on the channel number display sections 2a and 5a is changed to one representative of the current selected channel SC, and various parameters (parameter values and operating amounts of operators) displayed on the display 2 are updated with those corresponding to the current selected channel SC.

If, on the other hand, the digital mixer apparatus is currently in the non-layer-linking mode as determined at step S104, the process moves to step S106, where the displays of the current selected channel and various parameters are updated.

As set forth above in relation to section (b) of FIG. 2 and FIG. 6B (step S96), arrangements are made in the above-described embodiment such that a newly-selected channel is stored into the history table in response to detection of an operation event of any one of the channel select switches $3_{b1}$-$3_{b24}$. However, because data of the selected channel is kept in the register SC until next time any one of the select switches is operated, the newly-selected channel need not necessarily be stored into the history table exactly at the time point when the select switch has been operated. Namely, the newly-selected channel may be stored into the history table in response to next operation of any one of the select switches.

In the embodiment, as described above, the plurality of input channels are fixedly allocated to the plurality of layers with no overlap (i.e., in such a manner that no input channel is allocated to two or more layers). In an alternative, the input channels to be allocated to the individual layers may be set as desired by the user, in which case a certain one or ones of the input channels may be allocated to two or more layers or may not be allocated at all to any of the layers. For each such input channel allocated to two or more layers, there is a need to set in advance which one of the two or more layers in question is to be selected or linked to the selection of the channel in the layer-linking mode. Further, for each input channel that does not belong to any of the layers, it is only necessary that arrangements be made such that no layer is selected or linked to the selection of the channel in the layer-linking mode because there is no layer to be selected for that channel.

Further, the process for reading out a history of a selected channel from the history table has been described above in relation to the case where a signal processing characteristic is controlled for the input channel signal processing section of the selected channel. Alternatively, a history of a selected channel may be read out from the history table not only for signal processing characteristic control on the input channel signal processing section of the selected channel, but also for mixed signal processing characteristic control on the output channel signal processing section of the selected channel.

In such a case, selection histories of the input and output channels may be recorded and read out to and from the history table in a mixed manner, or separate history tables may be provided for the input channels and output channels so that the history table for the input channels is used when the selected channel is an input channel while the history table for the output channels is used when the selected channel is an output channel.

Furthermore, whereas the preferred embodiment has been described above in relation to the case where histories of channels selected via the physical, actual layer selection switches and channel selection switches, the channels may be selected for editing via physical layer selection switches and channel selection switches indicated through software on an operating screen displayed on a display of a personal computer or the like and controlled via a mouse etc. on the screen.

As apparent from the foregoing, the embodiment of the present invention can advantageously read out histories of channels selected by several previous channel-selecting operations and control the signal processing characteristics of the input channel signal processing means with each of the thus read-out channels as an editing channel. Thus, when a particular signal processing characteristic is to be controlled for the input channel signal processing means of a plurality of given channels selected as editing channels, there is no need for the user to perform layer selecting and channel selecting operation each time switching is to be made among the editing channels; namely, in the instant embodiment of the present invention, switching can be made among the editing channels by the user only performing operation for reading out the channel selection histories. Consequently, when a value of the same parameter is to be adjusted for a plurality of given channels (i.e., focusing on these given channels), the instant embodiment conveniently allows the user to quickly access the plurality of given channels for which the layer selecting and channel selecting elements are provided at scattering locations.

Further, the instant embodiment of the present invention allows a selection, in response to a selection of a channel by channel history readout operation, as to whether or not the layer containing the selected channel should be selected in response to the channel selection. In the layer-linking mode, the channel selected by the channel history readout operation can be promptly controlled through operation of the channel operation section. In the non-layer-linking mode, on the other hand, the channel, which has been controlled so far through operation of the channel operation section, can continue to be controlled as before, irrespective of which channel has been selected through the channel history readout operation.

What is claimed is:

1. A digital mixer apparatus which includes signal processing sections corresponding to N channels, each of which is specified by a channel number, and mixes output signals from individual ones of the signal processing sections and in which the N channels are grouped to define a plurality of layers each having a different group of one or more channels allocated thereto and a maximum number of the channels that can be allocated to each one of the layers being a predetermined number M which is smaller than N, said digital mixer apparatus comprising:

a layer selection section that selects any one of the plurality of layers;

M channel operation sections each including at least a selecting control and a level control, the channels allocated to the one layer selected by said layer selection section being assigned respectively to said channel operation sections;

a level control section that, in response to an operation of the level control in any one of said channel operation sections, controls a signal level in the signal processing section of the channel assigned to the one channel operation section;

a channel selection section that, in response to an operation of the selecting control in any one of said channel operation sections, selects, as an edit channel, the channel assigned to the one channel operation section;

a channel history retaining section that retains a history of the channel numbers of the channels selected as the edit channel by said channel selection section in sequence;

a history readout section that, in response to a predetermined history readout instruction, reads out one of the channel numbers in the history retained by said channel history retaining section and selects a channel specified by the channel number, as the edit channel;

an editing channel display section that displays the channel number of the channel most recently selected as the edit channel by said channel selection section or said history readout section; and a selected channel control section that, in response to an editing operation, controls a signal processing characteristic in the signal processing section of the channel most recently selected as the edit channel by said channel selection section or said history readout section.

2. A digital mixer apparatus as claimed in claim 1 which further comprises a layer link control section that, when the channel is selected as the edit channel by said history readout section, controls said layer selection section to select the layer which the selected channel is allocated to.

3. A digital mixer apparatus as claimed in claim 1 which further comprises:

a mode designation section that designates any one of a link mode and a non-link mode; and a layer link control section that, when the channel is selected as the edit channel by said history readout section, controls said layer selection section to select the layer to which the selected channel is allocated if the link mode is designated, and leaves the current selection of the layer by said layer selection section unchanged if the non-link mode is designated.

4. A digital mixer apparatus as claimed in claim 1 which further comprises:

a selected layer display section that displays a layer selected by said layer selection section.

5. A digital mixer apparatus as claimed in claim 1 wherein, when the selecting control of any channel operation section is operated and the channel assigned to the channel operation section is newly selected as the edit channel by said channel selection section, said channel history retaining section adds the newly-selected channel to the history.

6. A digital mixer apparatus as claimed in claim 1 wherein, when the selecting control of any channel operation section is operated and the channel assigned to the channel operation section is newly selected as the edit channel by said channel selection section, said channel history retaining section adds, to the history, the channel having been selected so far as the edit channel.

7. A digital mixer apparatus as claimed in claim 1 wherein the allocation of the one or more channels to each of the layers is user configurable.

8. A digital mixer apparatus as claimed in claim 2 wherein the allocation of the one or more channels to each of the layers is user configurable, and when one of the N channels is allocated to two or more of the layers, one of the two or more layers is designated, as a layer to be selected by said layer link control section when the one channel is selected as the edit channel by said history readout section.

9. A digital mixer apparatus as claimed in claim 1 wherein said N channels are input channels of said digital mixer apparatus, and said signal processing sections are respective signal processing sections of the input channels.

10. A digital mixer apparatus as claimed in claim 1 wherein said N channels are input channels and output channels of said digital mixer apparatus, and said signal processing sections include respective signal processing sections of the input channels and output channels, wherein said plurality of layers include a plurality of input layers each having a different group of the input channels allocated thereto and an output layer having a group of the output channels, wherein said layer selection section selects one of the plurality of input layers and the output layer, and wherein said channel history retaining section retains the history of the channel numbers of the input channels and the output channels, selected as the edit channel by said channel selection section, in a mixed manner.

11. A digital mixer apparatus as claimed in claim 1 wherein at least either layer selecting controls of said layer selection section or the selecting controls of said channel operation sections are in the form of graphics, tabs or icons displayed on a display, and a selection is made among the layer selecting controls of said layer selection section or among the selecting controls of said channel operation sections by using a pointing device, such as a mouse, to operate a corresponding one of the graphics, tabs or icons.

12. An editing method for use in a digital mixer apparatus which includes signal processing sections corresponding to N channels, each of which is specified by a channel number, and mixes output signals from individual ones of the signal processing sections, in which the N channels are grouped to define a plurality of layers each having a different group of one or more channels allocated thereto and a maximum number of channels that can be allocated to each one of the layers in the digital mixer apparatus is a predetermined number M which is smaller than N and which includes M channel operation sections each including at least a selecting control and level control, said editing method comprising:

a layer selection step of selecting any one of the plurality of layers;

a step of assigning the channels allocated to the one layer, selected via said layer selection step, respectively to said M channel operation sections;

a step of, in response to operation of the level control in any one of said channel operation sections, controlling a signal level in the signal processing section of the channel assigned to the one channel operation section;

a channel selection step of, in response to an operation of the selecting control in any one of said channel operation sections, selecting, as an edit channel, the channel assigned to the one channel operation section;

a step of retaining, in a channel history retaining section, a history of the channel numbers of the channels selected as the edit channel by said channel selection step in sequence;

a history readout step of, in response to a predetermined history readout instruction, reading out one of the channel numbers in the history retained in said channel history retaining section and selecting a channel, specified by the channel number, as the edit channel;

a step of displaying, on a display, the channel number of the channel most recently selected as the edit channel via said channel selection step or said history readout step; and a step of, in response to an editing operation, controlling a signal processing characteristic in the signal processing section of the channel most recently selected as the edit channel via said channel selection step or said history readout step.

13. An editing method as claimed in claim 12 which further comprises a step of, when the channel is selected as the edit channel in response to the predetermined history readout instruction, newly selecting the layer to which the selected channel is allocated and then assigning the channels allocated to the newly-selected layer respectively to said M channel operation sections.

14. An editing method as claimed in claim 12 which further comprises:

a step of determining which of a link mode and a non-link mode is currently designated;

a step of, while the link mode is designated and when the channel is selected as the edit channel in response to the predetermined history readout instruction, newly selecting the layer which the selected channel is allocated to, and then assigning the channels allocated to the newly-selected layer respectively to said M channel operation sections; and a step of, while the non-link mode is designated, performing control to not change a currently-selected layer even when the channel is selected as the edit channel in response to the predetermined history readout instruction.

15. An editing method as claimed in claim 12 which further comprises:

a step of, when the channel most recently selected as the edit channel via said channel selection step or said history readout step is currently assigned to any of said M channel operation sections, indicating the channel operation section to which the selected channel is assigned.

16. A computer-readable medium containing a group of instructions for causing a computer to perform an editing method for use in a digital mixer apparatus which includes signal processing sections corresponding to N channels, each of which is specified by a channel number, and mixes output signals from individual ones of the signal processing sections, in which the N channels are grouped to define a plurality of layers each having a different group of one or more channels allocated thereto and a maximum number of channels that can be allocated to each one of the layers in the digital mixer apparatus is a predetermined number M which is smaller than N and which includes M channel operation sections each including at least a selecting control and level control, said editing method comprising:

a layer selection step of selecting any one of the plurality of layers;

a step of assigning the channels allocated to the one layer, selected via said layer selection step, respectively to said M channel operation sections;

a step of, in response to operation of the level control in any one of said channel operation sections, controlling a signal level in the signal processing section of the channel assigned to the one channel operation section;

a channel selection step of, in response to an operation of the selecting control in any one of said channel operation sections, selecting, as an edit channel, the channel assigned to the one channel operation section;

a step of retaining, in a channel history retaining section, a history of the channel numbers of the channels selected as the edit channel by said channel selection step in sequence;

a history readout step of, in response to a predetermined history readout instruction, reading out one of the channel numbers in the history retained in said channel history retaining section and selecting a channel, specified by the channel number, as the edit channel;

a step of displaying, on a display, the channel number of the channel most recently selected as the edit channel selected via said channel selection step or said history readout step; and a step of, in response to an editing operation, controlling a signal processing characteristic in the signal processing section of the channel most recently selected as the edit channel selected via said channel selection step or said history readout step.

17. A computer-readable medium as claimed in claim 16 which further comprises a step of, when the channel is selected as the edit channel in response to the predetermined history readout instruction, newly selecting the layer to which the selected channel is allocated and then assigning the channels allocated to the newly-selected layer respectively to said M channel operation sections.

18. A digital mixer apparatus as claimed in claim 1, which further comprises a selected channel-operation-section display section that, when the channel most recently selected as the edit channel by said channel selection section or said history readout section is currently assigned to any of said M channel operation sections, indicates the channel operation section to which the selected channel is assigned.

19. A digital mixer apparatus as claimed in claim 2 wherein the allocation of the one or more channels to each of the layers is user configurable, and when one of the channels is allocated to none of the layers, and is selected as the edit channel by said history readout section, said layer selection section keeps on selecting a currently-selected layer.

20. A digital mixer apparatus as claimed in claim 1 wherein said N channels are input channels and output channels of said digital mixer apparatus, and said signal processing sections include respective signal processing sections of the input channels and output channels, wherein said plurality of layers include a plurality of input layers each having a different group of the input channels allocated thereto and an output layer having a group of the output channels, wherein said layer selection section selects one of the plurality of input layers and the output layer, and wherein said channel history retaining section retains a history of the channel numbers of the input channels selected as the edit channel by said channel selection section and a history of the channel numbers of the output channels selected as the edit channel by said channel selection section separately from each other.

* * * * *